United States Patent [19]
Peeters

[11] Patent Number: 5,598,691
[45] Date of Patent: Feb. 4, 1997

[54] FOLDING HAY RAKE WITH STABILIZING SUPPORT ASSEMBLY

[75] Inventor: Kenneth J. Peeters, Bear Creek, Wis.

[73] Assignee: H&S Manufacturing Co., Inc., Marshfield, Wis.

[21] Appl. No.: 396,568

[22] Filed: Mar. 1, 1995

[51] Int. Cl.[6] ................................................. A01D 78/14
[52] U.S. Cl. ............................................. 56/377; 56/385
[58] Field of Search ............................. 56/377, 367, 372, 56/380, 384, 385

[56] References Cited

U.S. PATENT DOCUMENTS

| | | | |
|---|---|---|---|
| 2,658,324 | 10/1953 | Johnson . | |
| 2,925,702 | 2/1960 | Plant . | |
| 2,982,081 | 5/1963 | Cooley . | |
| 3,108,424 | 10/1963 | Van Der Lely et al. . | |
| 3,466,860 | 9/1969 | Winkel et al. . | |
| 3,667,200 | 6/1972 | Pool et al. . | |
| 4,040,490 | 8/1977 | Anderson | 171/63 |
| 4,078,366 | 3/1978 | Carmichael | 56/377 |
| 4,183,198 | 1/1980 | Sligter | 56/377 |
| 4,245,458 | 1/1981 | Smith | 56/376 |
| 4,315,546 | 2/1982 | Fahrenholz | 171/65 |
| 4,496,003 | 1/1985 | Bynum | 171/63 |
| 4,723,401 | 2/1988 | Webster et al. | 56/377 |
| 4,723,403 | 2/1988 | Webster | 56/377 |
| 4,753,063 | 6/1988 | Buck | 56/377 |
| 4,932,197 | 6/1990 | Allen | 56/377 |
| 4,947,631 | 8/1990 | Kuehn | 56/377 |
| 4,974,407 | 12/1990 | Rowe et al. | 56/377 |
| 5,062,260 | 11/1991 | Tonutti | 56/377 X |
| 5,065,570 | 11/1991 | Kuehn | 56/377 |
| 5,199,252 | 4/1993 | Peeters | 56/377 |
| 5,305,590 | 4/1994 | Peeters | 56/384 X |

OTHER PUBLICATIONS

"Vicon" Brochure entitled Crop-Driven Finger Wheel Rakes. (Date Unknown).

*Primary Examiner*—Terry Lee Melius
*Attorney, Agent, or Firm*—Patterson & Keough, P.A.

[57] ABSTRACT

An agricultural implement includes a primary frame, having a front and rear, a pair of opposed secondary frames each having an inboard end and an outboard end and each operably supporting a bank of ground driven wheel rakes, coupled to the primary frame near the rear and a positioning assembly to pivotally deploy or retract the secondary frames. The positioning assembly includes a deployment slide mounted on the primary frame and a pair of opposed fixed length spreader bars connecting the deployment slide to the outboard end of the secondary frames. An equalizing assembly dynamically couples the secondary frames by coupling the spreader bars, to a dancer on the primary frame. The implement also has an adjustable rear wheel spacing mechanism, employing a pair of interacting screws.

13 Claims, 9 Drawing Sheets

FOLDING HAY RAKE WITH STABILIZING SUPPORT ASSEMBLY

BACKGROUND OF THE INVENTION

The present invention relates to agricultural implements and, in particular, the present invention relates to towable folding wheel rakes useful to form windrows from cut forage.

For many years it has been a typical agricultural process to cut forage, allow some drying to occur, rake it into piles where some additional drying occurs, collect and store it at a desirable moisture content, and subsequently feed such stored, dried forage to livestock. Weather conditions between the time of cutting and collecting play a major role in determining the resulting quality of the product of this agricultural process. In modern times, as farms have grown dramatically in area and the work force reduced in number, the process has been altered to employ power equipment to rake the drying cut forage into long, continuous windrows, which also encourages drying. The windrows may or may not be formed into bales prior to collection. Weather continues to be a major determinant of the overall outcome and the capability to rapidly rake a large field area in a short time is often critical.

Most modern power equipment for raking cut forage employs rotating tined wheels and most particularly banks of rotating tined wheels which are moved through a field of cut forage to form windrows. These banks of wheel rakes and more importantly multiple banks of wheel rakes can be quite wide to reduce the number of passes and thereby decrease the time required to rake a field. Wide rakes thereby provide a time and cost savings to agriculture and enhance the opportunity to perform the raking process so as to best utilize favorable weather conditions. Wide rakes, however, are a challenge to transport between fields.

In response to the transport challenge, wide rakes which fold to facilitate transport over highways and through fence gates have become popular in recent years. Peeters in U.S. Pat. Nos. 5,199,252 and 5,305,509 discloses an exemplary folding hay rake. The Peeters rake involves a towable primary transport frame with right and left secondary frames pivotally deployed from the rear end of the primary frame by action of a telescoping extension assembly. Each of the secondary frames has a bank of wheel rakes.

However, a drawback of such folding rake units can be observed when only one of the two deployed rake banks encounters extreme resistance during the raking of a field. Such resistance might be encountered, by way of example, in the form of an obstruction or an excessively large clump of cut forage. The unevenly encountered resistance results in a temporary delay of one of the rake banks. The primary frame then accumulates stress, resiliently twists or bends slightly in response, and the implement temporarily follows an unintended pathway through the field. Once the uneven delaying resistance has been passed, the two opposed rake banks again provide equal stress to the primary frame, relieving the temporary twist or bend on the primary frame and the implement begins to resume its intended pathway behind the tow vehicle. However, a fishtail pathway has occurred and must be accommodated on a subsequent pass by the tow vehicle operator.

Typically, the tow vehicle operator will increase the overlap of the subsequent pass through the field and optionally reduce the towing speed in response to the fishtail pathway. Both of these responses fail to utilize the potential efficiency of a wide raking implement. Additionally, the stress on the implement framing is undesirable in that the useful life of implement is reduced and the frequency of breakdowns is increased.

Increasing the frame members sizes to stiffen the implement frame is an unacceptable solution to this problem because of increased manufacturing cost and increased implement weight. A more expensive implement which requires more fuel input to a larger tow vehicle for operation due to increased weight again fails to exploit the potential efficiency of wide folding rakes.

The present invention provides an ingenious solution to reduce fishtailing and detrimental uneven frame stress. The present invention is compatible with the use of relatively fine frame members on the agricultural implement, which tends to minimize the implement's weight and does not result in excessive increases in manufacturing costs. The agricultural implement of this invention therefore allows better exploitation of the potential efficiency of a wide folding wheel rake. Further, other aspects of the present invention provide versatility and fine adjustments in forage raking operations.

SUMMARY OF THE INVENTION

The present invention, in a first embodiment, is an agricultural implement which is towed across a field to gather cut forage into windrows. The implement folds or retracts to facilitate highway transport and/or passage through narrow field gates and building doors. The inventive agricultural implement, when deployed and operated, covers a wide path through a field with reduced fishtailing of the implement from an intended path when encountering uneven resistance. The inventive implement includes a primary frame having a front end, a rear end, and opposed sides; a pair of opposed secondary frames each having an inboard end and an outboard end and each operably supporting a bank of wheel rakes; joint means for operably coupling each of the secondary frames adjacent the inboard end to the primary frame adjacent the rear end; positioning means to pivotally deploy or retract the secondary frames relative to the primary frame; and equalizing means to dynamically couple the secondary frames when deployed. The position regulating means include: a deployment slide mounted upon the primary frame and shiftable forward and rearward (i.e. longitudinally) along the primary frame, a positioning connector mounted outboard on each of the secondary frames, and a pair of opposed fixed length spreader bars, each of the spreader bars pivotally connected to the deployment slide at an inboard end and pivotally connected to the positioning connector of the associated secondary frame at an outboard end. The equalizing means include: a pivotable connection intermediate the inboard and outboard ends of each of the spreader bars, a dancer assembly slidably mounted on the primary frame for generally unfettered movement forward and rearward along the primary frame, the dancer having a pair of pivotable connections, and a pair of equalizer bars, each extending from one of the pivotable connection of the spreader bars to one of the pivotable connections on the dancer. Most preferably, the deployment slide is shifted by hydraulic power. Preferably, one of the secondary frames may be retracted and one of the secondary frames deployed while the equalizer assembly attached to the positioning assembly for the deployed secondary frame.

In a another embodiment, the agricultural implement also includes a pair of wheels at the rear end of the primary frame. The pair of wheels on the primary frame may be adjustably spaced one from the other. Most preferably, self steering or caster wheels are supplied adjacent the outboard ends of the secondary frames to support the secondary frames. More specifically, the agricultural implement includes a primary frame with a front end, a rear end, and opposed sides; a pair of opposed secondary frames each having an inboard end and an outboard end and each operably supporting a bank of ground driven wheel rakes, with the secondary frames operably connected to the primary frame; a pair of spaced apart rear wheels supporting said primary frame; a mechanism for continuously and simultaneously adjusting the spacing of both of the rear wheels transversely from the primary frame. The mechanism preferably includes: a first screw having an interior thread of a first pitch and an exterior thread of a second pitch, the second pitch being half that of the first pitch, the first screw mounted for rotation with respect to the one of the wheels, a second screw having an exterior thread complementary to the interior thread of the first screw and inserted therein, the second screw mounted fixedly with respect to the other of the wheels, and a internally threaded receiver fixedly transversely mounted to the primary frame and having the exterior of the first screw inserted therein. In the preferred embodiment the first screw is rotated, relative to both the internally threaded receiver and the second screw, by a hand crank.

In another embodiment, a mechanism is provided to initially rake the future location of the windrow in advance of forming the windrow at that location. In that embodiment, an agricultural implement includes a primary frame with a front end, a rear end, and opposed sides; a central rake mounted adjacent the front end of the primary frame and arranged for ground driven raking under the primary frame; a pair of opposed secondary frames each having an inboard end and an outboard end and each operably supporting a bank of ground driven wheel rakes operably coupled adjacent the rear of the primary frame and extending sideways therefrom; and wherein forcing the implement along a path through a field of cut forage forms a central windrow on ground initially raked by the central rake. The present invention also includes a method of windrowing cut forage comprising the steps of: providing an agricultural implement having a wheel supported primary frame, with a forward mounted ground driven rake, oriented to rake cut forage away from the primary frame and a rearward mounted bank of ground driven rakes, oriented to rake cut forage toward the primary frame; moving the agricultural implement across the cut forage, so as to initially clear a location for a windrow and subsequently form a windrow upon the cleared location.

DETAILED DESCRIPTION

Comprehension of the present invention can be gained through reference to the drawings in conjunction with a thorough review of the following explanation. In order to facilitate a full appreciation of the invention, an overview of the preferred embodiment is initially provided. The overview is followed by more detailed explanation, and, subsequently, operation and use of the invention are described. By "forage" herein is meant not only food for livestock such as horses and cattle, such as hay, but also similar materials such as straw which might be used for bedding rather than food.

Overview of the Agricultural Implement

Figure 1:
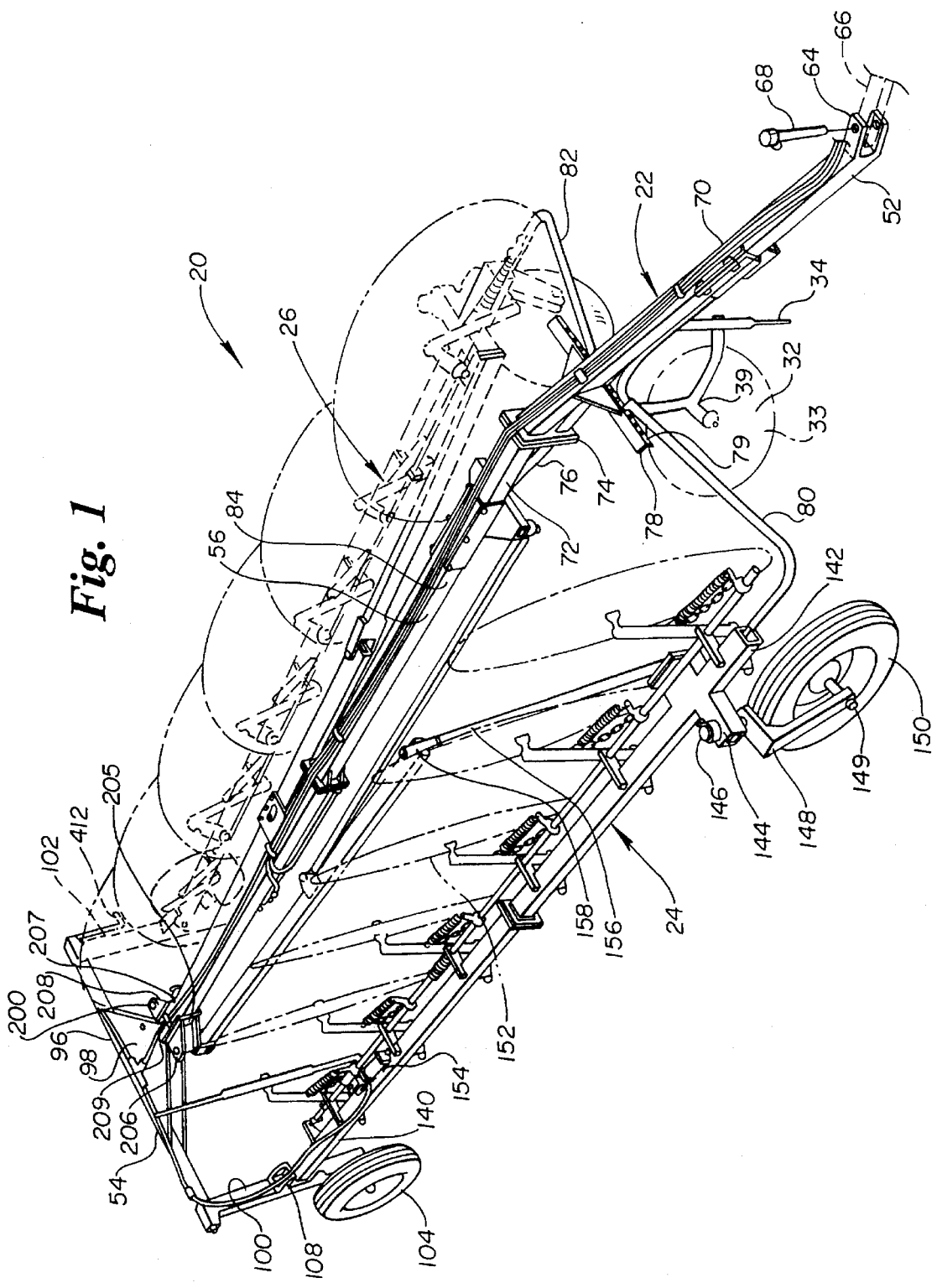
FIG. 1 is a perspective view of the agricultural implement of the present invention in transport position, with a portion of a tow vehicle and certain portions of the invention which are obscured in this view shown in phantom.
Figure 2:
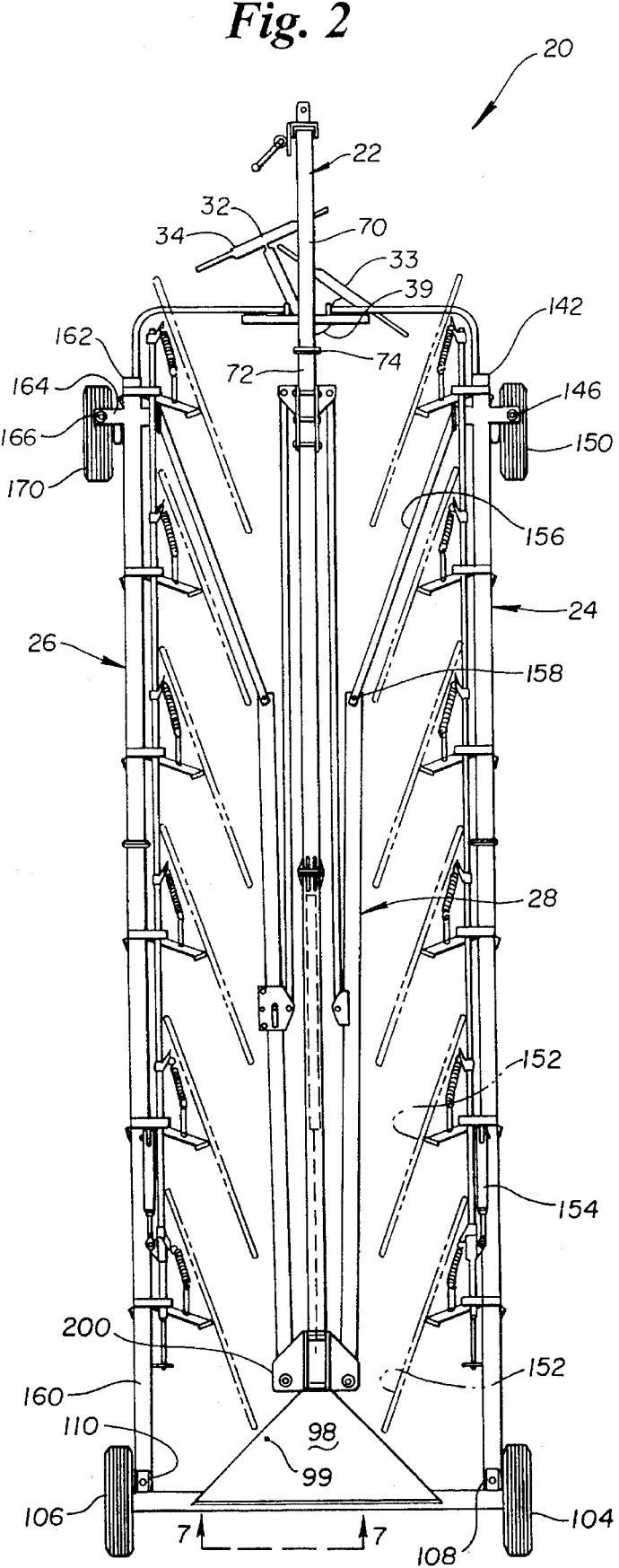
FIG. 2 is a top plan view of the implement of FIG. 1, with portions of individual rakes shown in phantom.
Figure 3:
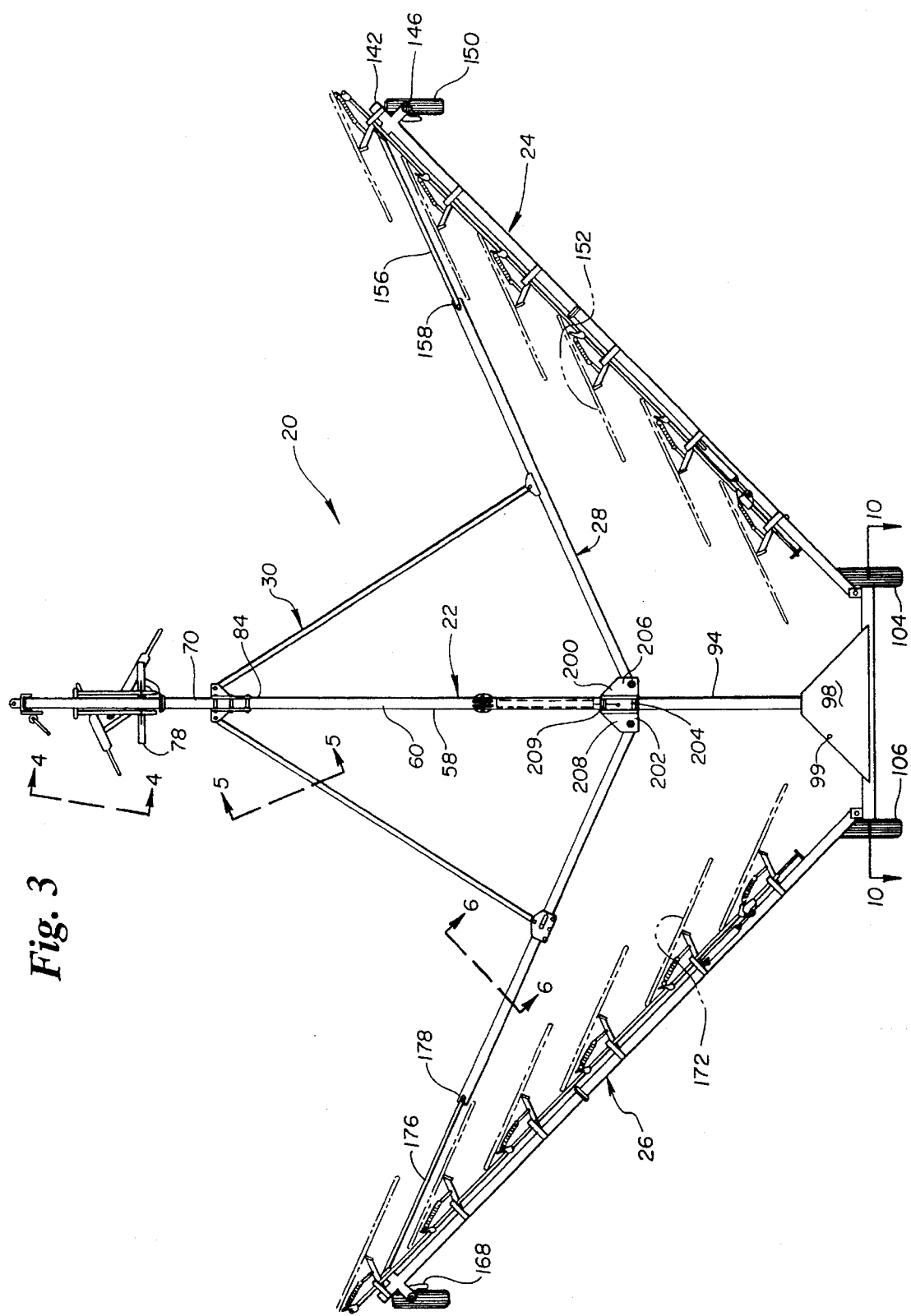
FIG. 3 is a top plan view of the agricultural implement of the present invention in deployed position, with portions of individual rakes shown in phantom.

Referring to the drawings, an agricultural implement 20 of the present invention includes a primary frame 22, a right secondary frame 24, and a left secondary frame 26. The secondary frames 24 and 26 may each occupy a transport position or retracted relationship relative to the primary frame 22, as depicted in FIGS. 1 and 2. Alternatively, the secondary frames 24 and 26 may also occupy deployed positions or relationships relative to the primary frame 22, as depicted in FIG. 3. Pivotal motion to deploy and retract the secondary frames 24 and 26 relative to the primary frame 22 is imparted by a positioning assembly 28. The secondary frames 24 and 26 are dynamically equalized in relationship to the primary frame 22 by an equalizing assembly 30 acting between the primary frame 22 and the positioning assembly 28. The agricultural implement 20 also is shown with a divider rake 32 mounted on the primary frame 22. The primary frame 22 is supported on two rear spaced apart wheels which are adjustable as to spacing.

Primary Frame

Figure 8:
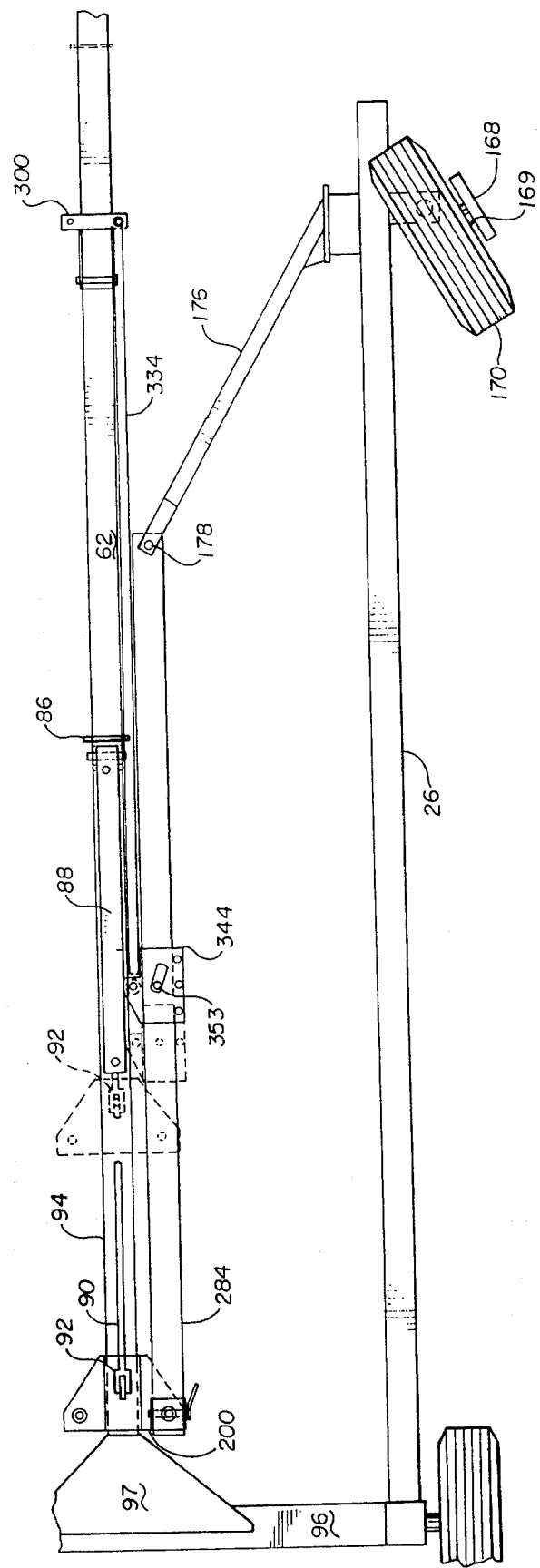
FIG. 8 is a fragmentary bottom plan view of the implement of FIG. 1, showing much of the primary frame and the left secondary frame with individual rakes omitted.
Figure 9:
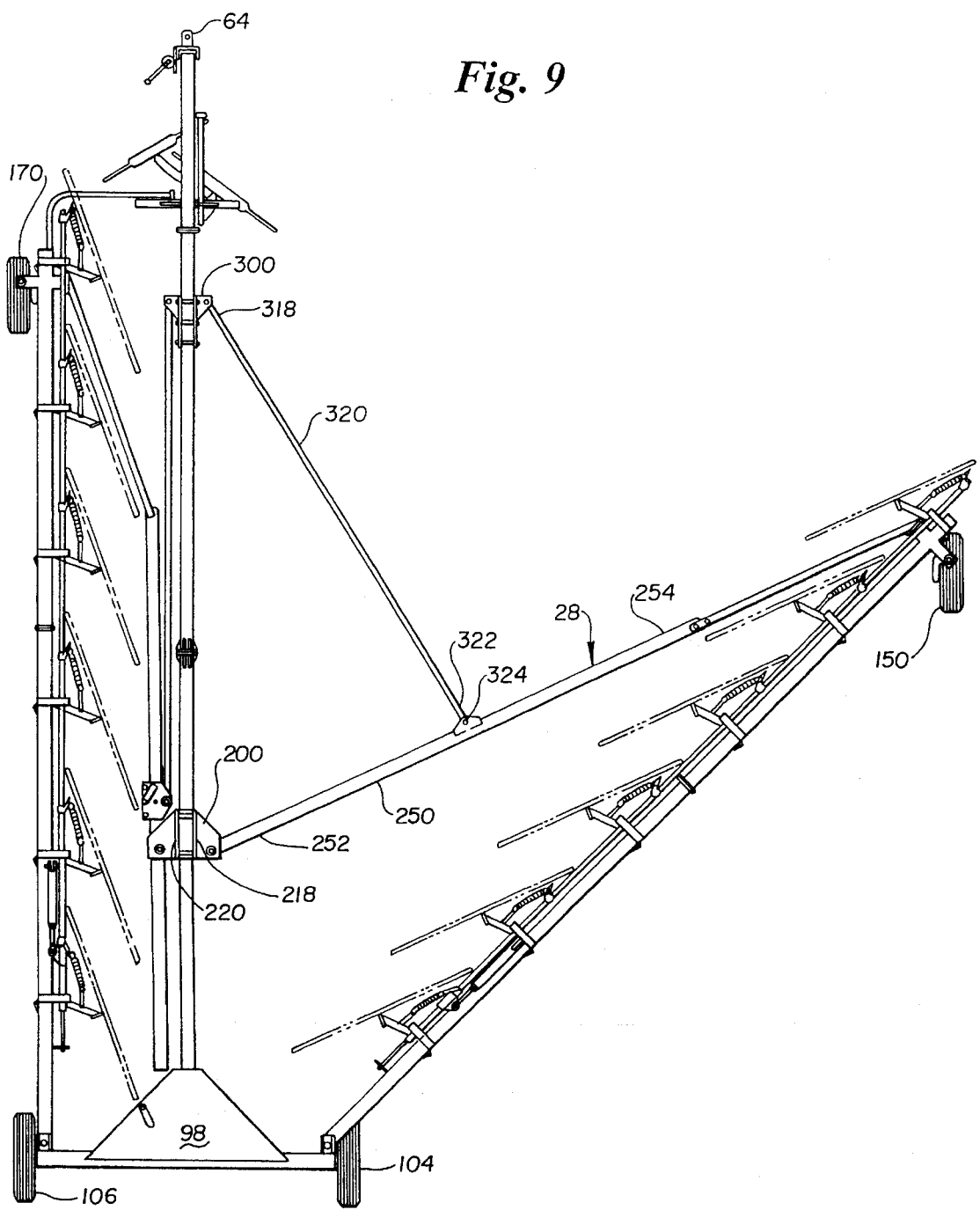
FIG. 9 is a top plan view with the right secondary frame deployed and the left secondary frame in transport position, portions of individual rakes are shown in phantom.

The primary frame 22, as shown in FIG. 1, has a front end 52, a rear end 54, a right side 56, a left side 58, a top side 60, and a bottom side 62 (shown in FIG. 8). Adjacent the front end 52, a typical agricultural hitch 64 (i.e. top and bottom spaced apart leaves with co-aligned apertures) provides reversible attachment of the implement 20 to a towing vehicle. Preferably, the tow vehicle has a compatible draw bar 66 (shown in phantom in FIG. 1) with an appropriate aperture to accept a hitch pin 68 when interposed in the hitch 64. Most preferably, when the implement 20 is to be operated, the tow vehicle is a farm tractor or equivalent device with the additional capability to provide quick connections to the intake and outlet of a hydraulic fluid pressuring system, as much of the implement 20 is preferably hydraulically operated.

However, it should be noted that for transport, in the retracted position, the implement 20 may be towed by light duty trucks lacking such hydraulic systems, and may travel on smooth highways at rates of speed up to roughly 50 miles per hour. The hitch 64 is attached to tongue 70 which ascends gradually rearward from the relatively low elevation of the tow vehicle draw bar 66 to an elevation roughly chest high and connects to the front end of a tubular spine 72 through a flanged bend 74.

The elevation of the spine 72 is significant for avoiding interference and potential trapping of cut forage during high speed (about 15 miles per hour) raking operations. The spine 72 extends horizontally rearward from bend 74. Bend 74 is strengthened by a truss 76 on its underside. The truss 76 also intersects the flange of bend 74.

A transport bracket 78 is transversely mounted on the tongue 70, adjacent the bend 74 and includes a plurality of transversely spaced apart receiving apertures 79 on each side of the tongue 70 for adjustable temporary mounting of right and left transport spars 80 and 82 respectively. In retracted or transport position, the spars 80 and 82 lock the secondary frames 24 and 26 parallel to the spine 72 of the primary frame 22. Preferably, a divider rake 32 is mounted on the underside of the tongue 70 of the primary frame 22, adjacent the bend 74 and the transport bracket 78. Such a location of the divider rake 32 provides adequate elevation above the ground and yet also provides maximum time to act upon any cut forage and allow such forage to drop to the ground again before such forage is subsequently impacted by rakes on the secondary frames 24 and 26.

Continuing the description of the primary frame 22 in a rearward direction, a dancer bearing surface 84 provides a smooth surface for substantially unfettered movement of portions of the equalizing system, as will be subsequently described. Optionally, this surface may be lightly greased to inhibit corrosion and reduce surface friction or left dry to avoid accumulating dirt, dust and particles of forage on the surface.

Rearward of the dancer bearing surface 84 is a bottom tab 86 and a rearward extending hydraulic cylinder 88 connected to the bottom tab 86. An associated ram 90 of the hydraulic cylinder 88 may driven rearward (extension) or pulled forward (retraction) by hydraulic action and thereby move its terminal clevis 92 rearward or forward. The ram 90 and clevis 92 are show in retracted position in phantom in FIG. 8. The clevis 92 lies immediately below a deployment slide bearing surface 94 and connects to the positioning assembly 28, as will be described in more detail subsequently. As with the dancer bearing surface 84, the deployment slide bearing surface 94 may be lightly greased to inhibit corrosion and reduce surface friction or left dry to avoid accumulating dirt, dust and particles of forage on the surface.

Rearward of the deployment slide bearing surface 94 is a connection to cross tree 96 which is strengthened by permanent attachment, (i.e. welding) to bottom gusset 97 and top gusset 98. Internal details of the cross tree 96 will be discussed subsequently. Gussets 97 and 98 serve an added function of providing a temporary storage aperture 99 for connection pins, as will also be described subsequently.

Cross tree 96, in turn, is supported by right post 100 and left post 102. Outboard and at the bottom of each of the posts 100 and 102 are right and left rear wheels 104 and 106, respectively. These two wheels 104 and 106 are mounted on fixed axles, projecting outboard from the posts 100 and 102, and are oriented for forward travel of the implement 20, although the spacing between them is optionally adjustable as will be described subsequently. On the forward side of each of the posts 100 and 102, intermediate the crosstree 96 and the respective wheels 104 and 106 are right and left vertical hinges 108 and 110, respectively. These vertical hinges 108 and 110 connect to and carry right and left secondary frames 24 and 26, respectively.

Right Secondary Frame

The right secondary frame 24 has an inboard end 140, connected to the right vertical hinge 108. Adjacent the opposite or outboard end 142 is a pivot bracket 144, housing a vertical pivot 146 atop a raked fork 148, a horizontal axle 149 and a right outboard wheel 150, which is free to caster or serve as an orbital idler wheel. The wheel 150 is, therefore, self steering and supports the outboard end 142 of the right secondary frame 24.

A right bank of wheel rakes 152, preferably six ground driven wheel rakes, is carried by the secondary frame 24. When lowered into appropriate ground tension contact, each of the rakes of the right bank of wheel rakes 152 rake and rotate such that cut forage lying on the ground is raked toward the primary frame 22. In concert, as the bank of wheel rakes 152 simultaneously rotate and are towed forward, most cut forage encountered is raked into a windrow passing between the right rear wheel 104 and the left rear wheel 106. Further, the bank of wheel rakes 152 may be raised or lowered relative to the right secondary frame 24 by a hydraulically powered rake actuator assembly 154. Banks of wheel rakes on secondary frames which may be raised and lowered, preferably hydraulically, are known in this art and the disclosures of U.S. Pat. Nos. 5,199,252 and 5,305,509, to Peeters, are incorporated herein by reference.

Adjacent the right outboard end 142, near the bracket 144, is a tip strut 156 which is connected at its outboard end to the right secondary frame 24 and projects inboard and rearward in an ascending orientation, interposed between the wheel rakes, most preferably between the most outboard located wheel rake and the second most outboard located wheel rake. At the inboard end of the tip strut 156 is a knuckle 158 which connects to the positioning assembly 28.

Left Secondary Frame

The left secondary frame 26 is generally a mirror image of the right secondary frame 24 and has an inboard end 160, connected to the left vertical hinge 110. Adjacent the opposite or outboard end 162 is a pivot bracket 164, housing a vertical pivot 166 atop a raked fork 168, a horizontal axle 169 and a left outboard wheel 170, which is free to caster or serve as an orbital idler wheel. The wheel 170 is self steering and supports the outboard end 162 of the left secondary frame 26.

A left bank of wheel rakes 172, preferably six ground driven wheel rakes, is carried by the left secondary frame 26. When actuated, each of the rakes of the left bank of wheel rakes 172 rotate such that cut forage lying on the ground is raked toward the primary frame 22. In concert, as the bank of wheel rakes 152 simultaneously rotate and are towed forward, most cut forage encountered is raked into a windrow passing between the right rear wheel 104 and the left rear wheel 106. Further, the left bank of wheel rakes 172 may be raised or lowered relative to the left secondary frame 26 by rake actuator assembly 174, preferably hydraulically and independent of the right bank of wheel rakes 152. Banks of wheel rakes on secondary frames which may be raised and lowered and hydraulically rotated are known in this art and the disclosures of U.S. Pat. Nos. 5,199,252 and 5,305, 509, to Peeters, as noted earlier, are incorporated herein by reference.

Adjacent the left outboard end 162, near the bracket 164, is a tip strut 176 which is connected at its outboard end to the left secondary frame 26 and projects inboard and rearward, ascending to roughly the elevation of the tubular spine 72 and interposed between the wheel rakes. Most preferably, between the outer most and second outermost wheel rakes of the bank 172. At the inboard end of the tip strut 176 is a knuckle 178 which also connects to the positioning assembly 28.

Positioning Assembly

The positioning assembly 28 includes a deployment slide 200 mounted on the primary frame 22 in the region of the deployment slide bearing surface 94 of the tubular spine 72. The deployment slide 200 is shiftable, forward and rearward, along the deployment slide bearing surface 94. The deployment slide 200 has a top plate 202, with a rectangular central portion 204, which overlies a length of the deployment slide bearing surface 94. Optionally, top rollers may be included in the deployment slide 200 to facilitate movement on the spine 72. A right raised wall 205 extends upward from the right edge of the rectangular central portion 204 and is topped by a right wing 206 extending rightward from the top of the right raised wall 205. This arrangement is generally mirrored by a left raised wall 207 extending upward from the left edge of the rectangular central portion 204, which in turn is topped by left wing 208 extending leftward from the top of the raised wall 207. A bolt 209 extends between the right raised wall 205 and the left raised wall 207 adjacent the right and left wings 206 and 208 respectively, and is spaced apart from the rectangular central portion 204. Together, the rectangular central portion 204, right and left raised walls 205 and 107 and bolt 209 define a fairlead or aperture atop the deployment slide 200. Hydraulic pressure supply and return lines for the actuation of elevation of banks of wheel rakes and/or electrical wiring may pass through this fairlead.

The deployment slide 200 also has a bottom plate 210. The bottom plate 210 has a rectangular central portion 212, which underlies substantially the same length of the deployment slide bearing surface 94 as the central portion 204 of the top plate 202, a right wing 214 extending rightward from the central portion 212 and a left wing 216 extending leftward from the central portion 212. The top and bottom rectangular central portions 204 and 212 are joined by right and left slide walls 218 and 220, such that a length of the deployment slide bearing surface 94 of tubular spine 72 is loosely enclosed in a sliding relationship.

An ear 222 is welded to and depends from the lower rectangular central portion 212 and connects to the terminal clevis 92 of the ram 90 of hydraulic cylinder 88. Extension of the hydraulic ram 90 therefore forces the deployment slide 200 rearward along the deployment slide bearing surface 94 approaching the gusset 98 and cross tree 96. Retraction of the hydraulic ram 90 forces the deployment slide 200 frontward along the deployment slide bearing surface 94.

Depending from the lower right wing 214 is a right deployment gimbal 240 which includes vertical axle 242, carrying a depending right gimbal bracket 244 which in turn carries a horizontal gimbal axle 246. Vertical axle 242 is pivotally held by a vertical axle housing 248 extending vertically between the top right wing 206 and lower right wing 214. The horizontal gimbal axle 246 of the right gimbal 240 therefore always remains horizontal yet may be re-oriented by turning of the vertical gimbal axle 242.

A right spreader 250 is pivotally attached to the horizontal gimbal axle 246 at an inboard end 252 and also a pivotally attached at the opposite or outboard end 254 to the right knuckle 158 of the right tip strut 156. The attachment of the outboard end 254 of the right spreader 250 to the right knuckle 158 may be viewed as the interface between the right secondary frame 24 and the positioning assembly 28. That is, the right spreader 250, couples the outboard end 142 of the right secondary frame 24, through the tip strut 156, to the deployment slide 200 of the positioning assembly 28, through the right deployment gimbal 240. Movement of the of the deployment slide 200 rearward pivotally retracts the right secondary frame 24. Movement of the deployment slide 200 forward pivotally deploys the right secondary frame 24.

Depending from the lower left wing 216 is a left deployment gimbal 260 which includes vertical axle 262, carrying a horizontal gimbal axle 264. Vertical axle 262 is pivotally held by a vertical axle housing 266 extending vertically between the top left wing 208 and lower left wing 216. The horizontal gimbal axle 264 of the left gimbal 260 therefore always remains horizontal yet may be re-oriented by turning of the vertical gimbal axle 262. A left gimbal bracket 268 depends from and is carried by the left gimbal axle 262. The left gimbal bracket 268 further includes a gimballed pocket 270, which is open on two ends, and a removable pin 272 traversing the gimballed pocket 270. The pin 272 is held in place by a retaining key 274. A left spreader 280 is reversibly held, at its inboard end 282, in the gimballed pocket 270 by the removable pin 272. The opposite or outboard end 284 of the left spreader 280 is pivotally pinned to the knuckle 178 of the left tip strut 176 on the left secondary frame 26.

When inboard end 282 of the left spreader 280 is pinned in the gimballed pocket 270, the left deployment gimbal 260 functions similarly to the right deployment gimbal 240, pivotally pulling the left secondary frame 26 into a retracted position as the deployment slide 200 is moved rearward and pivotally deploying the left secondary frame 26 as the deployment slide 200 is moved forward. However, when the left secondary frame 26 is retracted, in the travel position, and the inboard end 282 is not pinned in the gimballed pocket 270, the gimballed pocket 270 slides along the surface of the left spreader 280 when the deployment slide is actuated by the ram 90

Equalizing Assembly

The equalizing assembly 30 includes a dancer 300. The dancer 300 has a U-shaped body 302, with a lower base 304, a right side 306, and a left side 308. The body 302 is proportioned to enclose a length of tubular spine 72 with the sides 306 and 308 extending above the spine 72. One or more, preferably three, bolts 310 extend between the upper portions of the sides 306 and 308, thereby defining an enclosure about the spine 72. The dancer 300 can move forward or rearward along the spine 72. Preferably, a fairlead 312 is present on one of the bolts 310, most preferably, a bolt 310 adjacent the forward end of dancer 300, and may serve to control hydraulic lines and/or electrical wiring when the dancer 300 moves forward or rearward along the spine 72.

A crossbar 314 is transversely mounted adjacent the forward edge of the lower base 304 of the dancer 300.

A right ball joint 316 depends from adjacent the right end of the dancer crossbar 314 and is pivotally connected to an inboard end 318 of an equalizer bar 320. The opposite or outboard end 322 is pivotally connected by a permanent ball joint 324 mounted intermediate the inboard and outboard ends 252 and 254 of the right spreader bar 250. Preferably, the mounting location of the ball joint 324 is about midway between the inboard and outboard ends 252 and 254.

Figure 5:
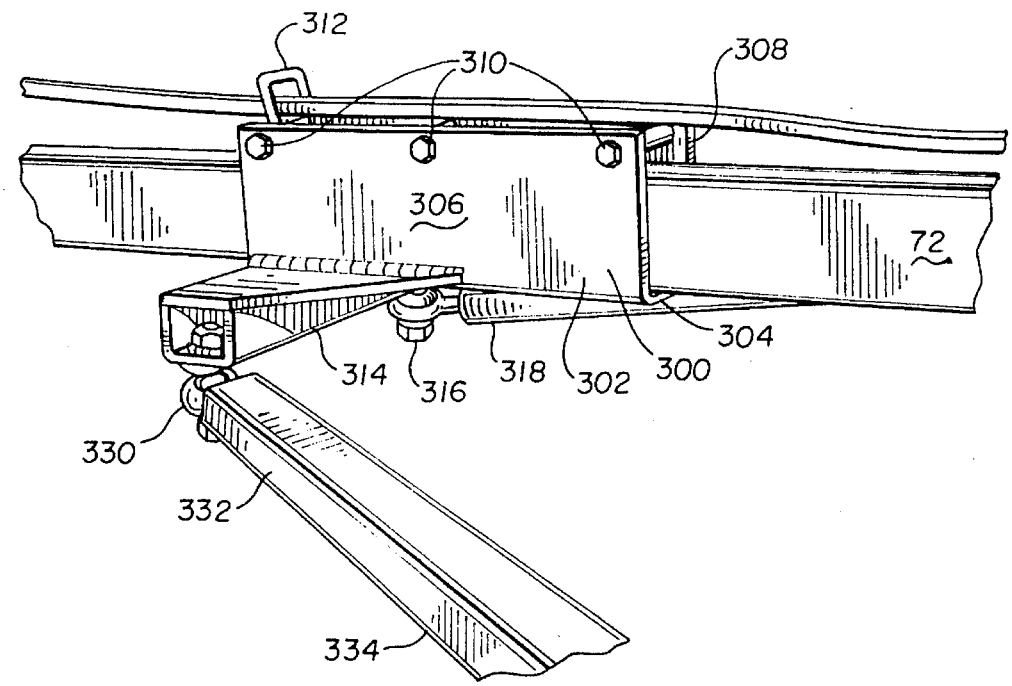
FIG. 5 is a fragmentary perspective view thereof taken along 5—5 of FIG. 3 showing the dancer assembly.
Figure 6:
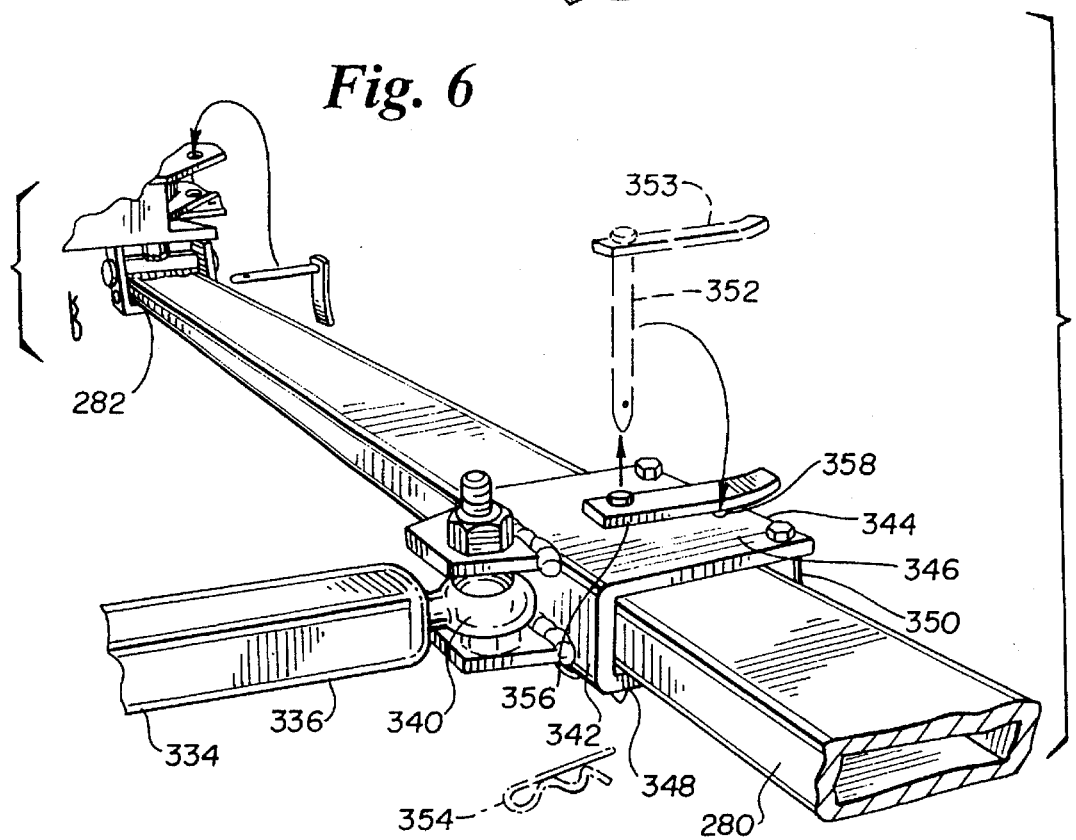
FIG. 6 is a fragmentary perspective view thereof taken along 6—6 of FIG. 3 showing the intermediate mount of the spreader bar and a portion of the equalizer bar.
Figure 7:
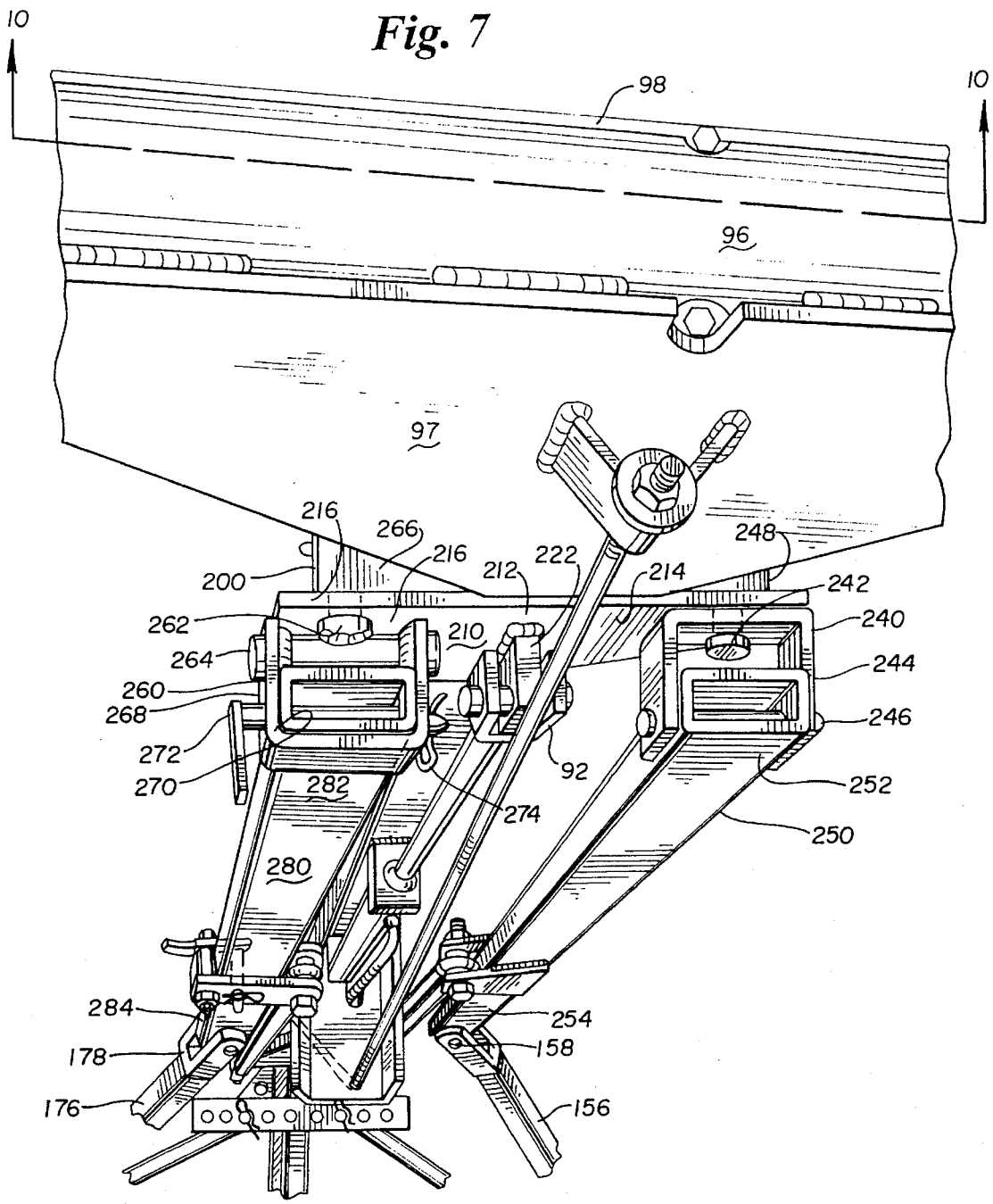
FIG. 7 is a fragmentary perspective view thereof taken along 7—7 of FIG. 2 and viewed from slightly below the primary frame.

A left ball joint 330, depicted in FIG. 5, depends from adjacent the left end of the dancer crossbar 314 and is pivotally connected to an inboard end 332 of a left equalizer bar 334. The opposite or outboard end 336, as depicted in FIG. 6, is pivotally connected by a ball joint 340 mounted on the inboard side 342 of a slide 344 fitted over the left spreader 280, intermediate the inboard and outboard ends 282 and 284. The slide 344 has a top plate 346 and a bottom plate 348, extending from the inboard side 342 which sandwich and extend past the left spreader 280. One or more, preferably two, vertical rollers 350 are bolted to the extensions of plates 346 and 348 to enclose a length of the left spreader 280. The slide 344 and the left spreader 280 include pin receiving apertures to reversibly engage the slide 344 to the left spreader 280. Most preferably, the engagement position is about mid-way between the inboard and outboard ends 282 and 284 of the left spreader 280.

A pin 352, preferably having a tab 353, (shown installed and also shown removed in phantom in FIG. 6), is provided to reversibly engage the slide 344 to the left spreader 280. When installed, the pin 352 preferably is captured by a retaining key 354 installed in a key hole 356. Alternatively, when the slide 344 is unengaged, the pin 344 may by conveniently retained in stowage aperture 358, located in the extension region of plates 346 and 348, adjacent the bolt roller 350.

Divider Rake Assembly

Figure 4:
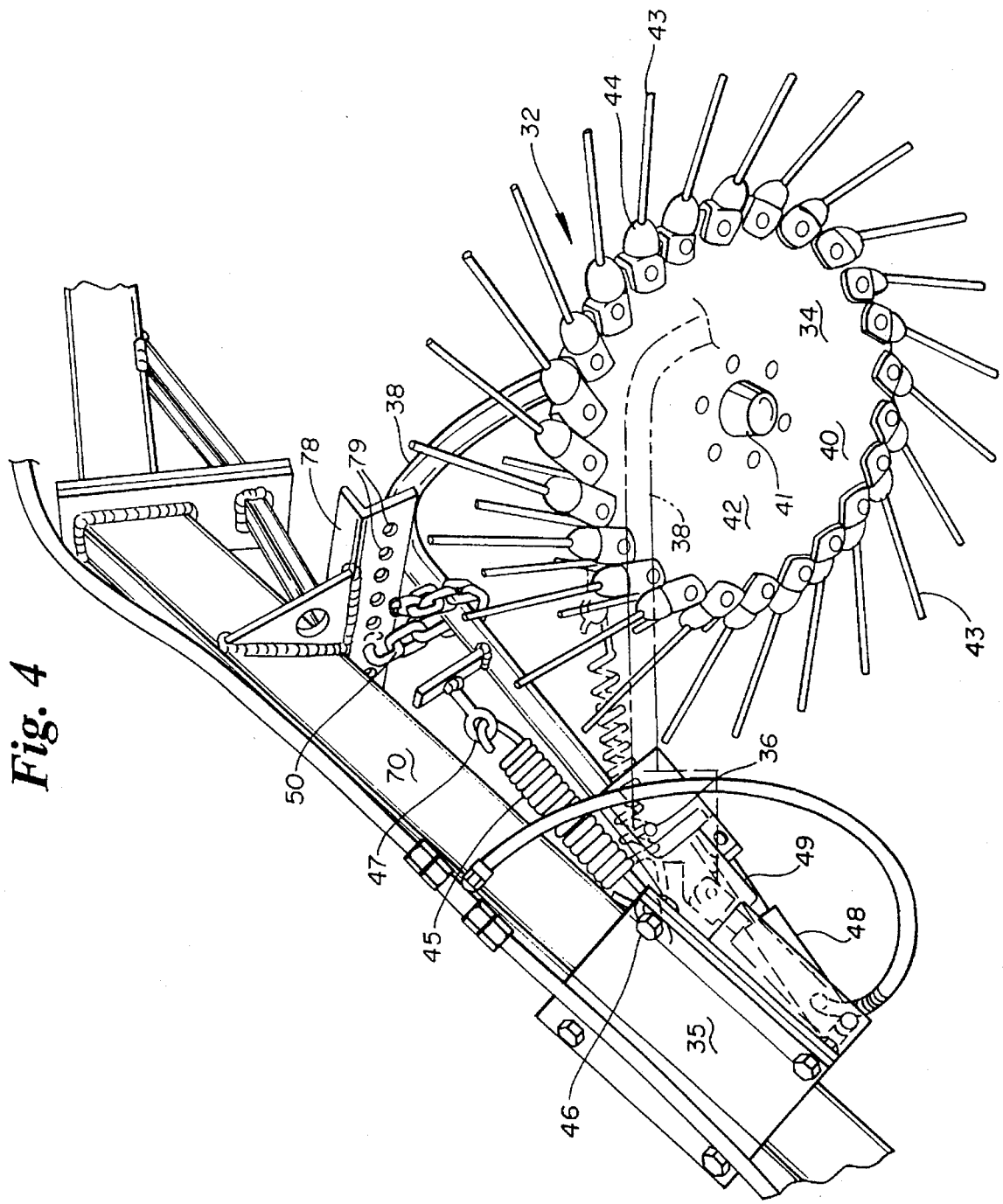
FIG. 4 is a fragmentary perspective view thereof taken along 4—4 of FIG. 3 showing a primary frame mounted auxiliary divider rake assembly in transport position; with fragments of the auxiliary divider rake assembly shown in deployed position.

The divider rake assembly 32, as depicted in FIG. 2, includes a right 33 and left rake 34. For ease of comprehension, the left rake 34 will be explained in detail. Left rake 34, as depicted in FIG. 4, is pivotally mounted to the tongue 70 by a mounting clamp 35 with a pivot 36 carrying an "L" shaped hanger frame 38. (In FIG. 4, a fragment of the "L" shaped hanger frame 38 is also depicted in phantom in a lowered or deployed position.) Opposite the pivot connection to clamp 38, "L" shaped hanger frame 38 with a yoke 39 carries a pair of hydraulically powered rake wheel 40, with a hub 41, disk 42, and projecting tines 43 mounted in flexible mounts 44 at the periphery of the disk 42. The disk 42 is angled with respect to the implement 20 and preferably at an angle of roughly 60° with respect to the primary frame 22 (see FIG. 2.)

As shown in FIG. 4, a coiled tension spring 45 connects an eye 46 on the mounting clamp 34 to an eye 47 on the upper side of the "L" shaped hanger frame 38. The spring 45 reduces ground pressure of wheel rake 40 to avoid raking stones and dirt into the cut forage. It is sufficient to substantially reduce the size of a hydraulic control cylinder 48 undermounted to the mounting clamp 34 and extends toward the "L" shaped hanger frame 38. A hydraulic ram 49 with a terminal clevis pivotally connected to the underside of "L" shaped hanger frame 38 raises the "L" shaped hanger frame 38 when extended. When fully raised, such as to transport the implement 20, a restraint chain 50 permanently attached at one end to the transport bracket 78 is looped under the "L" shaped hanger frame 38, to eliminate reliance upon hydraulic cylinder 48 for the maintenance of desired elevation of the wheel rake 40.

The right rake 33 is substantially a mirror image of the left rake 34 and is also mounted on yoke 39, but as may be observed from FIG. 2, is mounted slightly rearward in order to avoid interference with the left rake 34. For this reason, the yoke 39 is lengthened slightly on the right side relative to the left side of yoke 39. During the complete raking operation, the right and left auxiliary rakes 33 and 34, respectively, of the auxiliary divider rake system 32, initially rake cut forage from the center of the pathway of the implement 20. This is advantageous because raking of the cut forage re-orients the cut forage to promote drying. Additionally, raking tends to lift the cut forage up and encourage support by stubble. After the center of the pathway has been raked free of cut forage by the auxiliary rake system 32, the windrow is subsequently formed at that location by the banks of wheel rakes on the right and left secondary frames 24 and 26 respectively.

Operation in Field

The function of the present invention may be understood by first considering the dynamics encountered when operating normally. Specifically, normal operation may be defined as both secondary frames 24 and 26 deployed, the slide 344 and gimballed pocket 270 both engaged by their respective pins 352 and 272, the banks of wheel rakes 152 and 172 lowered and operating, and the implement 20 being towed across a field of cut forage in the process of forming a windrow. As long as both banks of wheel rakes 152 and 172 encounter relatively similar amounts of cut forage, the implement 20 follows the tow vehicle. However, when an excessive differential in the amount of cut forage or an obstacle is encountered by only one side, that side is delayed slightly and tends to drag back slightly relative to the opposite bank of wheel rakes. In turn, the delayed side is pulled and pivoted slightly rearward relative to the primary frame and the implement 20 tends to bow in the spine 72, turning toward the delayed side, and deviating from the pathway prescribed by the tow vehicle. This tendency to turn is counteracted by the equalizing assembly 30. The rearward pull is transferred through the equalizer bar, either 320 or 334, associated with the delayed side to the dancer 300 which moves slightly rearward on the tubular spine 72 and transfers a portion of the defection to the other equalizer bar thereby spreading some of the delay and deflection to the opposite side of the implement. The net effect is that although the opposed secondary frames 24 and 26 extend a substantial distance from the primary frame 22 and are exposed to different regions and obstacles of a field and may experience differential dynamic challenges, the implement 20 tends to follow the path of the tow vehicle.

This equalization of the dynamic stresses encountered when raking allows a relatively light frame to form the implement 20, saving in manufacturing costs and weight relative to the heavier frame required in the absence of the present invention. The frame of the implement 20 is stiffened vertically by a truss 76 at the bend 74 and other trusses may be added if desired near the rear of the spine 72 due to the raised elevation of the spine 72. As noted earlier, the elevated spine 72 helps to avoid cut forage which might be thrown in the air during raking.

When operated alternatively, only the right secondary frame 24 is deployed and the left secondary frame is retracted to the transport position, the slide 344 and gimballed pocket 270 both disengaged by removal of their respective pins 352 and 272, only the right bank of wheel rakes 152 lowered and operating, the implement 20 may be towed across a field of cut forage in the process of forming a windrow. Such an operation may be desirable in two situations: first, to begin to windrow the edge of a field, or second, in narrow or small fields where the entire width of the implement 20 would preclude operation. In the alternative operating mode, the deflection may still be experienced, however, the right equalizer bar 320 will still contribute some stability to the right spreader bar 250, due to its limited control of the midsection of the right spreader bar 250.

To achieve transport mode, both banks of rakes are raised and secondary frames 24 and 26 are retracted, by rearward action of the deployment slide 200, to positions generally parallel to the primary frame 22. Next, the secondary frames 24 and 26 are attached at their right and left outboard ends 142 and 162, respectively, through the right and left transport spars 80 and 82, respectively, to appropriate apertures 79 of the transport bracket 78. The divider wheel assembly 32 is raised and chained. This arrangement is depicted in FIGS. 1 and 2. Finally, if transport is to occur over a long distance, the hydraulic system may be disconnected from the tractor and the hitch pin 68 pulled for reattachment to a truck. Deployment is a reversal of this process and the deployed implement depicted in FIG. 3.

Adjustable Rear Wheel Assembly

Figure 10:
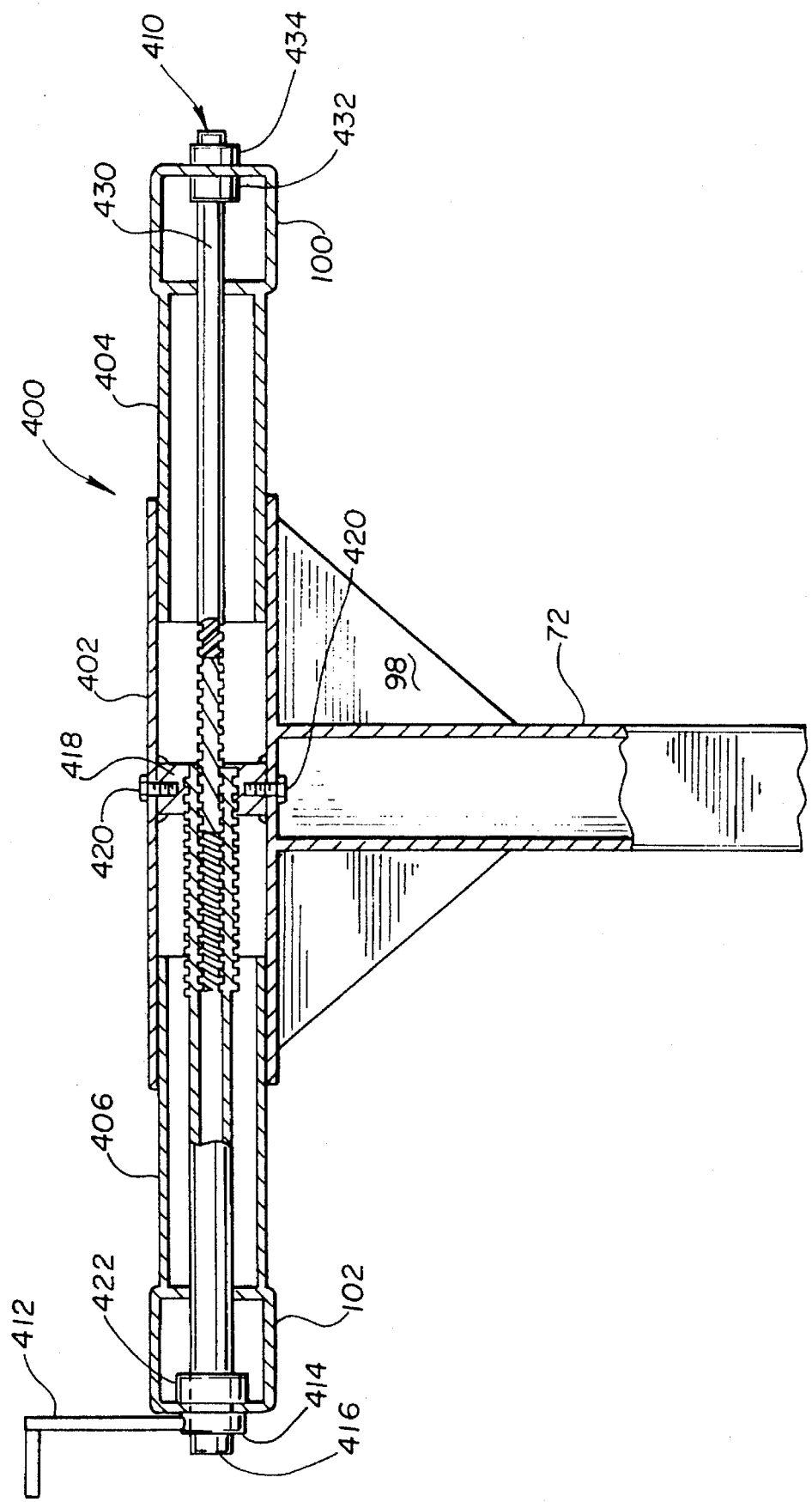
FIG. 10 is a fragmentary bottom sectional view taken along line 10—10 in FIG. 7.

In another embodiment of the present invention, the cross tree 96, depicted as a bottom view of a cross section in FIG. 10, forms part of an adjustable rear wheel assembly 400 which can increase or decrease the spacing between the right and left rear wheels 104 and 106, respectively. The cross tree 96 includes a central box tube 402 which is open on each end and permanently mounted and interposed between bottom gusset 97 and top gusset 98. Telescopically inserted within the central box tube 402 are right and left box tubes 404 and 406 which also telescopically project from the right and left ends open ends of the central box tube 402, respectively. At their opposed projecting ends, right and left box tubes 404 and 406 are permanently mounted to the tops of right rear post 100 and left rear posts 102. As previously indicated, right rear post 100 and left rear post 102 are carried by right rear wheel 104 and left rear wheel 106 which are mounted on to the posts on fixed axles oriented for forward travel. An adjustment screw assembly 410 extends through the cross tree 96. The adjustment screw assembly 410 includes a crank handle 412 on the left side of the implement 20 and is used to apply rotational motion by hand to a hub 414.

The hub 414 is fixed adjacent to the left end of a left screw 416 which is threaded on the exterior with twelve threads per inch and has an outer diameter of 1.25 inches and additionally the left screw 414 is threaded on the interior with six threads per inch at an interior diameter of ¾ inch. The interior threads are an ACME thread design which is adapted for strength and efficiency to either push or pull along the axis of the threads. The left screw 416 extends through an aperture in the outboard wall of left post 102 and onward through the left box tube 406 to a fixed nut 418 mounted centrally in the central box tube 402 by bolts 420.

The fixed nut 418 has threads to mate with the exterior threads of the left screw 416. An interior hub 422 is mounted on the left screw 416 at a location slightly spaced apart from the hub 414 of the crank handle 412. The outboard wall of the left post 102 is trapped between the two hubs 416 and 422 such that the left screw 416 can rotate and an axial push or pull motion will be transferred by the hubs 416 and 422 to the left post 102 and left box tube 406.

A right screw 430 having a ¾ inch diameter and 6 ACME exterior threads per inch is fixed by an interior nut 432 and an exterior nut 434 to an aperture in the outboard wall of right post 100. The right screw 430 is not free to rotate relative to the right post 100 and the right box tube 404. The right screw 430 extends in the interior of the left screw 416 and mates with the interior threads of the left screw 416.

The adjustment action of the screw assembly 410 is perhaps most easily explained by considering the result of turning the crank handle 412 so as to rotate the left screw 416 twelve counter clockwise revolutions. Such rotational action axially displaces the left screw 416 from the fixed nut 418 of the central box tube 402 approximately one inch to the left and causes the hubs 414 and 422 to be displaced axially, leftward by approximately one inch. Simultaneously, the right screw 430 is pushed axially rightward from the left screw 416 by approximately two inches. However, since the left screw 416 has been displaced leftward by one inch, the movement of the right screw 430 relative to the fixed nut 418 is an axial rightward movement of only one inch. Thus, the left post 102 and left box tube 406 will be telescopically pushed leftward by about one inch and simultaneously, the right post 100 and right box tube 404 will be pushed telescopically rightward by one inch. Because the right and left wheels 104 and 106 are mounted on the right and left posts 100 and 102, respectively, the spacing between them has increased by two inches as a result of twelve clockwise turns of the crank handle 412 and the tubular spine 72 remains in its original position.

To summarize the wheel adjustment: left screw 416 has an interior thread of a first pitch (6 TPI) and an exterior thread of a second pitch (12 TPI), the second pitch being half that of the first pitch, the left screw 416 is mounted for rotation with respect to the left wheel 106, the right screw 430 has an exterior thread complementary to the interior thread of the left screw 416 (6 TPI) and is inserted therein, the right screw 430 is mounted fixedly with respect to the right wheel 104. The left screw 416 interacts with both the fixed nut 418 and the right screw 430.

Because numerous modifications may be made of this invention without departing from the spirit thereof, the scope of the invention is not to be limited to the single embodiment illustrated and described. Rather, the scope of the invention is to be determined by appended claims and their equivalents.

What is claimed is:

1. An agricultural implement comprising:
   a primary frame having a front end, a rear end, and opposed sides;
   a pair of opposed secondary frames each having an inboard end and an outboard end and each operably supporting a bank of ground driven wheel rakes;
   joint means for operably coupling each of said secondary frames adjacent the inboard end to said primary frame adjacent the rear end; and
   positioning means to pivotally deploy or retract said secondary frames adjacent relative to said primary frame, the positioning means including:
   a deployment slide mounted upon said primary frame and shiftable forward and rearward along said primary frame,
   a positioning connector mounted outboard on each of the secondary frames, and a pair of opposed fixed length spreader bars, each of the spreader bars pivotally connected to the deployment slide at an inboard end and pivotally connected to the positioning connector of the associated secondary frame at an outboard end; and equalizing means to facilitate dynamic coupling of the secondary frames, when deployed, through coupling of the spreader bars, the equalizing means including:
a ball joint mount intermediate the inboard and outboard ends of the spreader bars,
a dancer assembly slidably mounted on the primary frame for generally unfettered movement forward and rearward along the primary frame, and
an equalizer bar extending therebetween.

2. The agricultural implement of claim 1 and further comprising: actuating means for shifting the deployment slide of the positioning means forward and rearward along said primary frame.

3. The agricultural implement of claim 2 and wherein the actuating means includes a hydraulic cylinder and ram connecting the deployment slide and the primary frame.

4. The agricultural implement of claim 2 and wherein the primary frame includes a pair of wheels at the rear end.

5. The agricultural implement of claim 4 and wherein the secondary frames are supported by caster wheels adjacent the outboard ends of the secondary frames.

6. An agricultural implement comprising:
a primary frame having a front end, a rear end, and opposed sides;
a pair of opposed secondary frames each having an inboard end and an outboard end and each operably supporting a bank of ground driven wheel rakes, the secondary frames operably connected to the primary frame;
a pair of spaced apart rear wheels supporting said primary frame; adjustment means for continuously and simultaneously adjusting the spacing of both of the rear wheels simultaneously from the primary frame, said adjustment means including;
a first screw having an interior thread of a first pitch and an exterior thread of a second pitch, the second pitch being half that of the first pitch, the first screw mounted for rotation with respect to the one of the wheels,
a second screw having an exterior thread complementary to the interior thread of the first screw and inserted therein, the second screw mounted fixedly with respect to the other of the wheels, and
a internally threaded receiver fixedly transversely mounted to the primary frame and having the exterior of the first screw inserted therein.

7. The agricultural implement of claim 6 and further including: means to rotate the first screw, relative to the internally threaded receiver and the second screw.

8. An agricultural implement comprising:
a primary frame having a front end, a rear end, and opposed sides;
a central rake mounted adjacent the front end of the primary frame and arranged for ground driven raking under the primary frame;
a pair of opposed secondary frames each having an inboard end and an outboard end and each operably supporting a bank of ground driven wheel rakes operably coupled adjacent the rear of the primary frame and extending sideways therefrom;

and wherein forcing the implement along a path through a field of cut forage forms a central windrow on ground initially raked by the central rake.

9. A method of windrowing cut forage comprising the steps of:
providing an agricultural implement having a wheel supported primary frame, with a forward mounted ground driven rake, oriented to rake cut forage away from the primary frame and a rearward mounted bank of ground driven rakes, oriented to rake cut forage toward the primary frame;
moving the agricultural implement across the cut forage, so as to initially clear a location for a windrow by raking cut forage away from the primary frame and subsequently form a windrow upon the cleared location by raking cut forage toward the primary frame.

10. An agricultural implement comprising:
a primary frame having a front end, a rear end, and opposed sides;
a pair of opposed secondary frames each having an inboard end and an outboard end and each operably supporting a bank of ground driven wheel rakes, each of said secondary frames being operably, pivotally coupled adjacent the inboard end to said primary frame adjacent the rear end and shiftable between an extended deployed position and a retracted transport position;
a deployment assembly including a deployment slide operably, shiftably carried by said primary frame, and a pair of opposed spreader bars, each spreader bar operably coupled to and extending between said deployment slide and a respective one of said secondary frames; and
an equalizing assembly including a dancer assembly operably, shiftably carried by said primary frame, and a pair of opposed equalizer bars, each equalizer bar operably coupled to and extending between said dancer assembly and a respective one of said spreader bars.

11. The invention as claimed in claim 10, said primary frame comprising a longitudinally extending beam, said deployment slide and said dancer assembly being shiftably carried by said beam.

12. The invention as claimed in claim 11, said pair of secondary frames comprising first and second rake assembly supporting beams, said pair of spreader bars including first and second spreader bars extending between said deployment slide and said first and second rake assembly supporting beams respectively, and said pair of equalizer bars including first and second equalizer bars extending between said dancer assembly and said first and second spreader bars respectively.

13. The invention as claimed in claim 12, said first spreader bar being selectively, detachably coupled to said first rake assembly supporting beam and said first equalizer bar being selectively, detachably coupled to said first spreader bar, such that said first spreader bar can be operably detached from said first rake assembly supporting beam, and said first equalizer bar can be operably detached from said first spreader bar, whereby said second rake assembly supporting beam can be extended to said deployed position while said first rake assembly remains in said retracted position.

* * * * *